Patented Aug. 26, 1924.

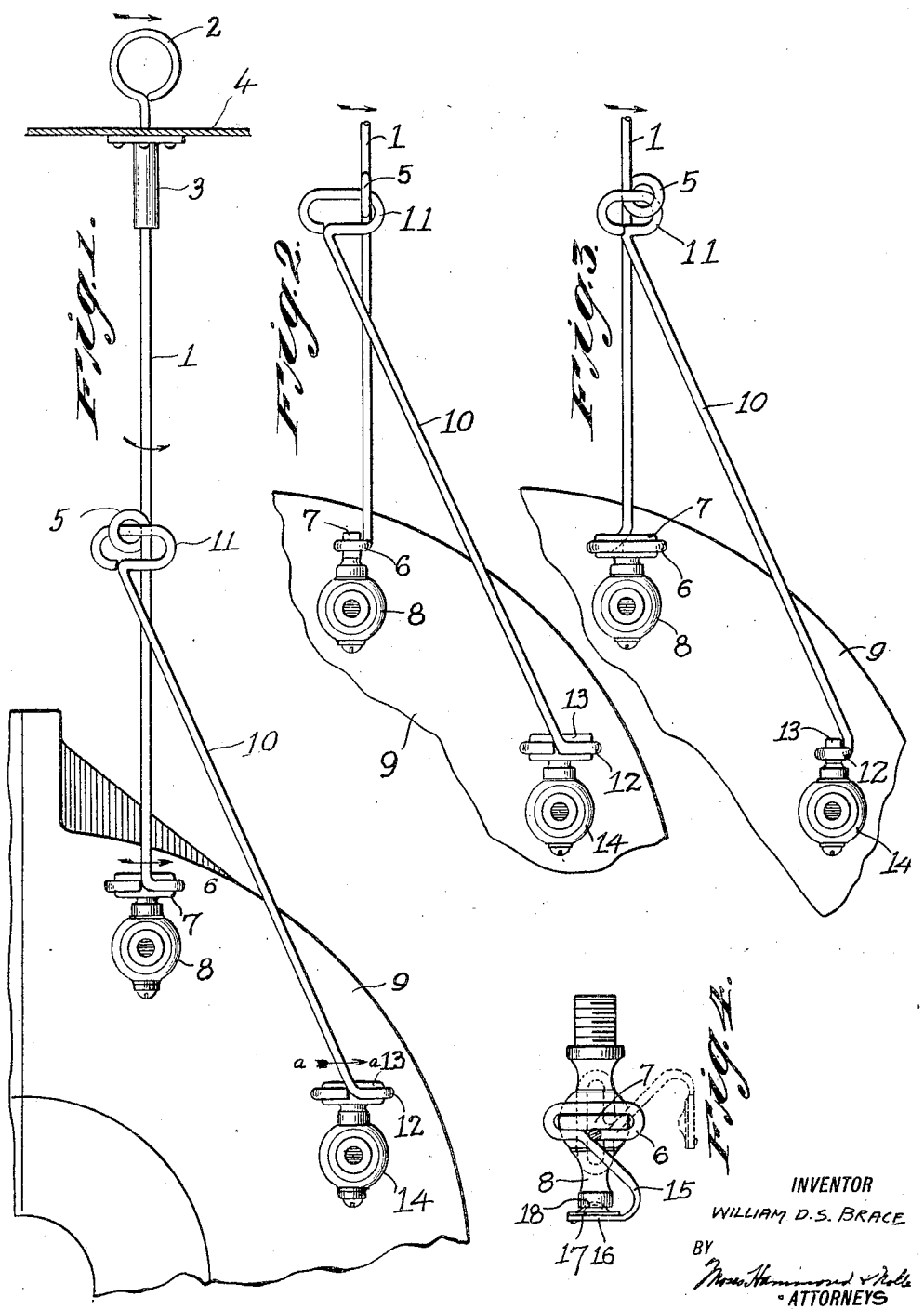

1,506,106

UNITED STATES PATENT OFFICE.

WILLIAM DEXTER SMITH BRACE, OF NORTH BANGOR, NEW YORK.

PET-COCK-OPERATING DEVICE.

Application filed April 7, 1923. Serial No. 630,551.

*To all whom it may concern:*

Be it known that I, WILLIAM DEXTER SMITH BRACE, a citizen of the United States, residing in North Bangor, Franklin County, and State of New York, have invented certain new and useful Improvements in Pet-Cock-Operating Devices, of which the following is a specification.

My invention relates to means for opening and closing at a distance pet cocks and similarly operating valve mechanisms, and more particularly is herein designed to successively open and close the pet cocks of an engine crank case of Ford automobile motors, and by slight mechanical changes to operate the pet cocks of other crank cases without departing from the principle of my invention.

The pet cocks are not readily accessible in these motors and cannot be reached without considerable bodily distortion and discomfort, and one cannot operate them manually without soiling his hands and clothes. Hence the purpose of my invention is to afford means for operating these pet cocks from a convenient position without exposure to the disadvantages of manual operation above stated. This I do by means of a device which is made to operate the thumb pieces of the pet cocks either from the dashboard or alongside the fender of an automobile while observation is made from a suitable vantage point. And the peculiar novelty of my invention resides in the fact that my device is so constructed as to successively open and close the said pet cocks or valves, as the case may be.

The pet cocks serve the purpose of indicating the level of oil in the crank case and are located to one side one above the other, so that if one wishes to determine the oil level in the crank case he opens the topmost pet cock first; if oil issues therefrom the oil is above that level; if oil does not issue therefrom the oil must be below that level. And by progressing down the line of pet cocks one can determine more or less accurately the amount of fuel in the crank case. Thus, if one wishes to determine the oil level in the crank case, he opens, first the uppermost pet cock; if no oil issues therefrom he opens the next lower pet cock, and if oil issues from it he knows that the oil level is somewhere between it and the topmost or next upper pet cock. In the Ford motor crank case and in other motors there are usually two pet cocks, one above the other and to one side of one another. If oil does not flow from the upper pet cock but does from the lower pet cock there is no occasion for immediate refilling, but if no oil flows from the lower pet cock the oil level must be below the safety level and immediate refilling is necessary.

As another element I may combine with my pet cock operating device an extension continuous with it to cap and uncap the nozzle of the pet cock according as the device is turned to open or close the pet cocks. The advantage of this is to keep the nozzle free from dirt which otherwise would clog the nozzle opening; and the nozzle is only uncovered when the pet cock is opened and covers the nozzle when the pet cock is closed.

In the accompanying drawings, I have illustrated by way of example one preferred form of my invention, in which—

Fig. 1 shows my device in operative position;

Fig. 2 shows my device turned through an angle of 90 degrees;

Fig. 3 shows my device turned through an angle of 180 degrees, and

Fig. 4 shows a top view of a pet cock with nozzle-capping extension of my device in opening and closing position, on the line $a$—$a$.

Throughout these figures like reference numerals represent like parts.

1 is the actuating rod for the upper pet cock 8 of which 2 is the handle. 3 is a sleeve through which the actuating rod 1 passes. 4 is the dashboard or fender to which sleeve 3 is attached. 5 is a circular loop or eye which is formed by twisting the actuating rod 1 in a plane through an angle of 360 degrees, and 6 is a collar to securely fit the thumb piece 7 of the pet cock 8 of the crank case 9. 10 is the auxiliary member for operating the lower pet cock having at its upper end an oval portion 11 which passes in substantially the same plane through the eye 5 and loosely links therewith. At its lower end auxiliary member 10 has a collar 12, similar to collar 6, to securely fit thumb piece 13 of the lower pet cock 14. 15 is an extension to the collar 6, 12, having a platform 16 on which is mounted a convex cup which fits into the nozzle opening 18 and caps it.

The modus operandi of my device is as follows: The collars 6, 12, are adjusted to the thumb pieces 7 and 13 of the pet cocks 8 and 14 in such a way that when the pet cocks are closed the eye 5 of the actuating rod 1 shall lie in the same plane with the thumb pieces 7, 13, as indicated in Fig. 1. The pet cocks 8 and 14 may then be opened by turning the handle 2 in a counter-clockwise direction. The upper pet cock 8 is opened when the actuating bar 1 is turned by its handle 2 through an angle of 90 degrees. The eye 5 on this first quarter turn couples loosely with the oval link 11 and because of the free play between them does not actuate auxiliary member 10 which operates the lower pet cock 14. However, at the end of the first quarter turn, the eye 5 is substantially at right angles to, contacts with and engages the oval portion 11 of the auxiliary rod 10. The next quarter turn of the handle 2 of the actuating rod 1 turns by means of the engaging eye 5 the auxiliary member 10 through an angle of 90, thereby opening the lower pet cock 14, and, at the same time, the upper pet cock 8 is closed by virtue of this latter quarter turn, as indicated in Fig. 3. By turning handle 2 a quarter turn in a clockwise direction upper pet cock 8 is opened, because every quarter turn of the actuating rod 1 opens and closes upper pet cock 8, but, because of the free play existing between the interlinking members 1 and 10 in this position, no action is exerted upon auxiliary member 10 and the lower pet cock remains open; thus, at this stage of operation, both cocks remain open, (not shown in the drawings, since there is need or advantage in having them both open). At the end of this latter quarter turn the eye 5 again engages the interlinking oval 11 of the auxiliary member 10, but comes in contact with it on the opposite side of the oval to the point of contact on the first counter-clockwise turn of the actuating rod 1. The next turn of the handle 2, continuing the clockwise motion, of course closes the upper pet cock, and, simultaneously, because of the transmitted motion given to the auxiliary rod 10 by means of the interlinking portions 5 and 11, closes the lower pet cock, bringing all the parts back again into the original position.

The nozzle capping element, being continuous and one with the operating members 1 and 10, of course, operates with them, capping a pet cock when it is closed, and uncapping it when it is open.

While I have illustrated one preferred form in which my invention may find embodiment, I do this by way of example only and do not wish to be limited to the precise details of construction shown as these may be altered without departing from the spirit and scope of my invention as defined by the appended claims.

What I claim is:

1. A device for operating at a distance pet cocks and the like comprising a rotatable operating member having a loop portion integral therewith at or about its middle portion and an auxiliary rod member interlinking with said loop by means of another loop at the upper end of said auxiliary rod member, and means connected with said rod members for engaging and operating the thumb pieces of pet cocks.

2. A device for operating at a distance pet cocks and the like comprising a rotatable operating member having a loop portion integral therewith at or about its middle portion and an auxiliary rod member interlinking with said loop by means of another loop at the upper end of said auxiliary rod member, means connected with said rod members for engaging and operating the thumb pieces of said pet cocks and means connected with said last mentioned means for capping and uncapping the nozzle openings of said pet cocks.

3. A device for operating at a distance pet cocks and the like comprising a rotatable operating member having means at its lower end to engage and operate the thumb piece of a pet cock, a loop at or about the middle portion of said operating member, an auxiliary member engaging and operating another pet cock, said auxiliary member having at its upper end a loop interlinking the first mentioned loop in such a way that when, at the first quarter turn of the operating member, the said pet cock to which it is joined is opened, the second pet cock remains closed because of the free play between the two interlinking loops of the rod members, and upon the next quarter turn in the same direction the first pet cock is closed and the second pet cock is opened by virtue of the motion given to the auxiliary rod member engaging the second pet cock by means of the interlinking operating loop and the auxiliary loop which at the beginning of this second quarter turn engage each other.

4. A device for operating at a distance pet cocks and the like comprising a rotatable operating member having means at its lower end to engage and operate the thumb piece of a pet cock, a loop at or about the middle portion of said operating member, an auxiliary member engaging and operating another pet cock, said auxiliary member having at its upper end a loop interlinking with the first mentioned loop in such a way that the first quarter turn of the rotatable operating member will open the pet cock to which it is connected while the second pet cock remains closed because of the free play between the interlinking loops of the rod members, and upon the next quarter turn in the same direction the first pet cock is closed and the second pet cock is opened by virtue of the motion given to the auxiliary member by the interlinking loop of the operating member engaging with the loop of the auxiliary member, and means operating synchronously with said pet cock operating means to uncap and cap the nozzle openings of said pet cocks according as the pet cocks are opened and closed.

WILLIAM DEXTER SMITH BRACE.